United States Patent [19]

Hellmann et al.

[11] Patent Number: 5,039,176

[45] Date of Patent: Aug. 13, 1991

[54] APPARATUS FOR AVOIDING WHEEL LOCKING IN A VEHICLE

[75] Inventors: Harald Hellmann, Ludwigsburg; Heinz Siegel, Stuttgart, both of Fed. Rep. of Germany

[73] Assignee: Robert Bosch GmbH, Stuttgart, Fed. Rep. of Germany

[21] Appl. No.: 561,432

[22] Filed: Aug. 1, 1990

[30] Foreign Application Priority Data

Sep. 15, 1989 [DE] Fed. Rep. of Germany ....... 3930890

[51] Int. Cl.$^5$ .................. B60T 8/32; B60T 8/44; B60T 13/12; F15B 9/12
[52] U.S. Cl. .................. 303/119; 303/68; 303/116
[58] Field of Search ............ 303/119, 116, 68-69, 303/113, 114, 115, 117, 84.1, 84.2; 188/181 A, 181 R

[56] References Cited

U.S. PATENT DOCUMENTS

| 3,549,212 | 12/1970 | Leiber | 303/119 |
| 3,550,966 | 12/1970 | Leiber | 303/119 |
| 3,731,980 | 5/1973 | Fink et al. | 303/119 |
| 3,837,712 | 9/1974 | Grossean | 303/117 |
| 4,099,793 | 7/1978 | Iio | 303/116 |
| 4,618,189 | 10/1986 | Nakanishi et al. | 303/119 X |
| 4,703,979 | 11/1987 | Nakanishi et al. | 303/119 X |
| 4,941,712 | 7/1990 | Hirobe | 303/119 X |
| 4,952,002 | 8/1990 | Arikawa et al. | 303/116 |
| 4,957,330 | 9/1990 | Morikawa et al. | 303/119 X |

FOREIGN PATENT DOCUMENTS 3904132 2/1989 Fed. Rep. of Germany .
0004971 1/1977 Japan .................. 303/119

Primary Examiner—Douglas C. Butler
Attorney, Agent, or Firm—Edwin E. Greigg; Ronald E. Greigg

[57] ABSTRACT

The brake system has at least one valve assembly, disposed between a master brake cylinder and at least one wheel for controlling the brake pressure during anti-skid operation. A pump is also provided for pumping pressure fluid, withdrawn from the wheel brake during a pressure reduction phase, to the master brake cylinder. A valve assembly comprising two parallel-connected 2/2-way valves is provided between the master brake cylinder and the pressure control valve assembly. During anti-skid operation, the first 2/2-way valve can be switched into a position (b) that throttles the flow of pressure fluid both from the pump to the master brake cylinder and from the master brake cylinder to the wheel brake. As a result, pulsations at the brake pedal of the master brake cylinder are largely avoided. The second 2/2-way valve, which can be switched by the pressure in the master brake line into its switch position (b) that blocks the flow path, can be switched over upon termination of the braking event into its switch position (a), in which its flow path is open and rapid brake pressure reduction is enabled. The second 2/2-way valve is likewise capable of being switched over into its switch position (a) whenever inadmissibly high pumping pressures are in effect.

4 Claims, 1 Drawing Sheet 5,039,176

APPARATUS FOR AVOIDING WHEEL LOCKING IN A VEHICLE

BACKGROUND OF THE INVENTION

The invention is based on an apparatus for avoiding locking of the wheels of a vehicle equipped with a brake system.

An apparatus of this kind has already been proposed (German Patent Application P 39 04 132.8), a corresponding patent application has been filed in the United States on Dec. 1, 1989, Ser. No. 444,246, in which the valve assembly between the master brake cylinder and the pump comprises a 2/2-way valve and a bypass valve. This bypass valve, embodied as a check valve, is open only from the master brake cylinder to the pump or to the wheel brakes. If the 2/2-way valve is reversed in its switch position by the pressure in the master brake cylinder in a braking event, then in the anti-skid mode of the known apparatus, pressure pulsations originating from the pressure reduction in the wheel brake, which are annoyingly perceptible at the brake pedal, are largely diminished by the throttling action of the 2/2-way valve. However, when pressure fluid flows back out of the master brake cylinder for the pressure buildup in the wheel brake, the throttling 2/2-way valve is bypassed via the bypass valve, which leads to perceptible, undesirable pulsations at the brake pedal.

OBJECT AND SUMMARY OF THE INVENTION

The apparatus according to the invention has an advantage over the prior art that in the anti-skid mode, both upon brake pressure reduction with a feedback of pressure fluid to the master brake cylinder and upon pressure buildup with a resupply of pressure fluid out of the master brake cylinder, pulsations at the brake pedal are avoided to the greatest possible extent, because the throttling action of the 2/2-way valve is effective in both flow directions. This also leads to a considerable reduction in the noise generated by the pumping of pressure fluid. Nevertheless, a rapid pressure reduction upon termination of the braking event during the anti-skid mode is possible, because a spring-actuatable second 2/2-way valve switches back to its zero position when the pressure in the master brake cylinder is dropping.

Advantageous features of and improvements to the disclosed apparatus are defined herein.

An embodiment of the apparatus defined herein is advantageous because it reliably avoids damage to or destruction of the valves, lines and other parts of the apparatus in the event of excess pump pressure during an anti-skid operation, for instance if the throttled flow path of the first 2/2-way valve should be stopped up.

A feature defined herein has an advantage that the component unit can be retroactively installed in existing apparatuses for avoiding wheel locking in which no provisions have been made for reducing pedal pulsations during anti-skid operation. The structural unit can be disposed in a simple manner in the course of the brake line leading from the master brake cylinder to the pressure control valve assembly and to the pump, suitably by flanging it to a unit that receives the pressure control valve assembly and pump.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
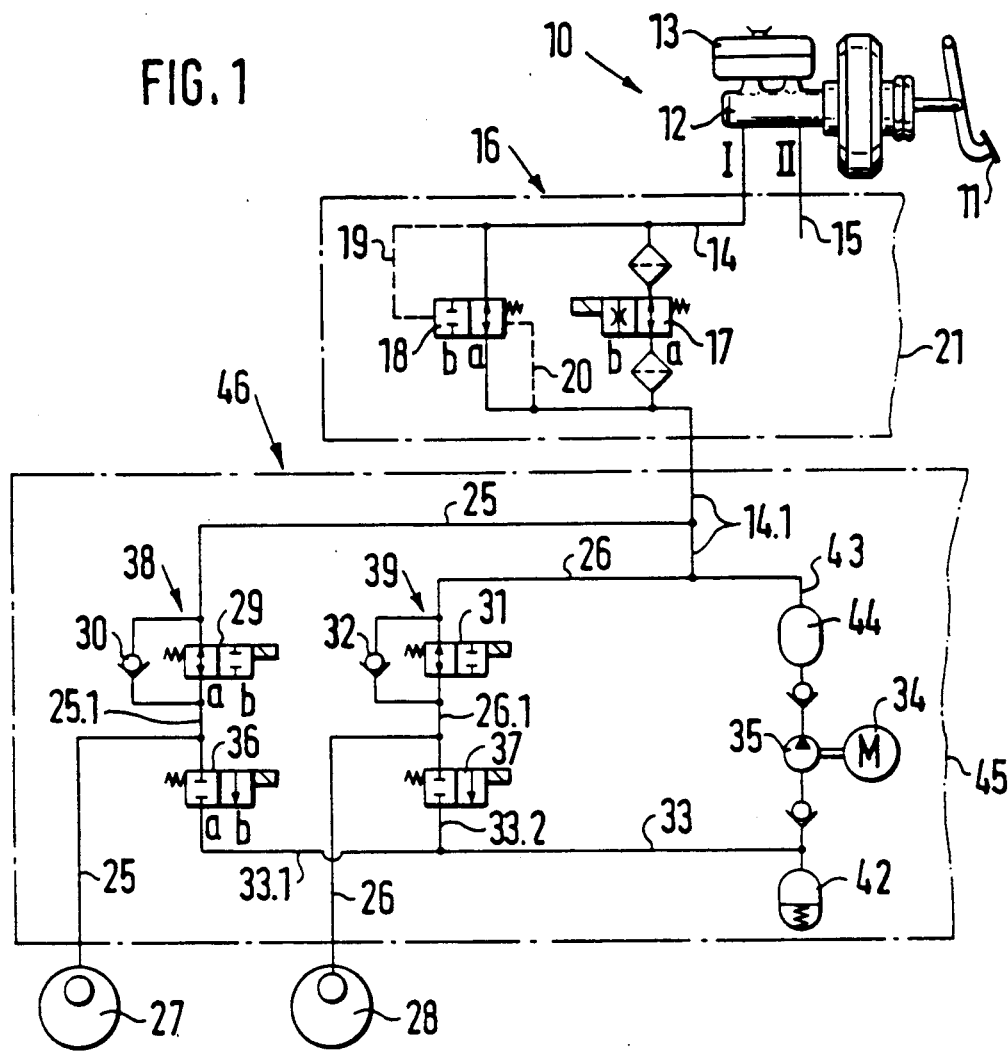
FIG. 1 is a diagram showing part of a brake system of a vehicle, having an apparatus for preventing locking or skidding of the vehicle wheels.

The brake system 10 schematically shown in the drawing in FIG. 1 has a master brake cylinder 12, which is actuatable by a brake pedal 11 and has a pressure fluid supply container 13. A master brake line 14 of a brake circuit I and a master brake line 15 for a brake circuit II both originate at the master brake cylinder 12. Brake circuit I is described in detail below. A valve assembly 16 comprising two parallel-connected 2/2-way valves 17 and 18 is disposed in the master brake line 14 of brake circuit I. The first 2/2-way valve 17 has an unthrottled flow path in its spring-actuatable zero position a. In its electromagnetically generatable switch position b, the first 2/2-way valve 17 has a throttled flow path. The second 2/2-way valve 18 has an unthrottled flow path in its spring-actuatable zero position a as well, while in its switch position b it blocks the flow of pressure fluid. To generate the switch position b as a function of the pressure generator in the master brake cylinder 12, the second 2/2-way valve 18 is connected by a control line 19 to the master brake line 14 coming from the master brake cylinder. For its return to the zero position a, the second 2/2-way valve 18 is also connected, by a second control line 20, to a segment 14.1 of the master brake line 14 located downstream of this multi-position valve. The two 2/2-way valves 17 and 18 of the valve assembly 16 are combined in a component unit 21 having a common housing. However, the valves 17 and 18 can also be disposed separately, with separate housings.

The master brake line 14 branches downstream of the valve assembly 16 into two wheel brake lines 25 and 26, which lead to wheel brakes 27 and 28 of the vehicle. Located in the wheel brake line 25 is an inlet valve 29 in the form of a 2/2-way valve having a spring-actuatable zero position a, in which the valve is switched for open passage. In an electromagnetically generatable switch position b, the flow path is blocked by the inlet valve 29. A bypass valve 30 is disposed parallel to the inlet valve 29. An identically embodied inlet valve 31 having a bypass valve 32 is located in the wheel brake line 26 Extending from segments 25.1 and 26.1 of the wheel brake lines 25 and 26 located between the inlet valves 29 and 31 and the wheel brakes 27 and 28, respectively, are line branches 33.1 and 33.2 of an intake line 33, which leads to a pump 35 for pressure fluid that is drivable by an electric drive motor 34. Located in the intake line segment 33.1 is an outlet valve 36, embodied as a 2/2-way valve and having a spring-actuatable zero position a that blocks the flow path through the valve. In the electromagnetically generatable switch position b of the outlet valve 36, contrarily, the flow path is open An identically embodied outlet valve 3 is located in segment 33.2 of the intake line 33. The inlet valve 29 associated with the wheel brake 27 and the outlet valve 36 form one pressure control valve assembly 38, and the valves 31 and 37 associated with the wheel brake 28 form another pressure control valve assembly 39.

Downstream of the two outlet valves 36 and 37, a pressure fluid reservoir 42 is connected to the intake line 33. A damper 44 for damping pressure oscillations in the pressure fluid that arise in pump operation is located in a pressure line 43 that originates at the pump 35 and leads to the segment 14.1 of the master brake line 14. The two pressure control valve assemblies 38 and 39, the pump 35, the pressure fluid reservoir 42 and the damper 44 all form a hydraulic unit 45 that is embodied as a structural unit. The structural unit 21 is preferably flanged directly to the hydraulic unit 45.

Brake circuit II is correspondingly equipped with the elements described above in order to slow down the vehicle via other wheel brakes, not shown.

The structural unit 21 and the hydraulic unit 45 form an apparatus 46 for avoiding locking of the wheels of the vehicle. The mode of operation of this apparatus 46 is as follows:

Actuation of the brake pedal 11 generates brake pressure in the master brake cylinder 12 that is effective in the respective wheel brakes 27 and 28, by displacement of pressure fluid through the master brake lines 14 and 15 and through the wheel brake lines 25 and 26 of the two brake circuits I and II. In this process the first 2/2-way valve 17 is in its zero position a, while the second 2/2-way valve 18, by imposition of pressure via the control line 19, assumes its switch position b.

The inlet valves 29 and 31 of the pressure control valve assemblies 38 and 39 are also in their zero positions a, as are the outlet valves 36 and 37.

In the event of skidding or locking of the vehicle wheel associated with wheel brake 27, for instance, during braking, a control unit (not shown) of the apparatus (46) switches the first 2/2-way valve 17, the inlet valve 29 and the outlet valve 36 into their switch position b. The control unit also starts up the drive motor 34 of the pump 35. As a result, a brake pressure reduction can be effected in the wheel brake 27, because pressure fluid is withdrawn from the wheel brake 27 through the outlet valve 36 and diverted to the pressure fluid reservoir 42 through the intake line 33. The pump 35 aspirates the pressure fluid from the pressure fluid reservoir 42 and pumps it back into the master brake cylinder 12 through the pressure line 43 and the master brake line 14. In this process, the pressure fluid is forced to take the throttled flow path through the first 2/2-way valve 17, which is in switch position b. By the throttling action of the first 2/2-way valve 17, pressure pulses at the brake pedal II are perceptible to the driver to only a very slight extent.

Following this pressure reduction, which stabilizes wheel rotation, the control unit switches the inlet valve 29 and outlet valve 36 into their zero position a, while the first 2/2-way valve 17 remains in its switch position b. Because the driver is still exerting pressure on the brake pedal 11, pressure fluid flows through the master brake line 14 and the wheel brake line 25 into the wheel brake 27, to build up braking pressure again there. During this operation as well, the throttling action of the first 2/2-way valve 17 prevails. These phases of pressure reduction and pressure buildup, which ensue in rapid succession in the anti-skid mode, are therefore hardly perceptible to the driver, in the form of greatly diminished pulsations of the brake pedal 11.

When anti-skid operation is ended, the control unit switches the first 2/2-way valve 17, along with the inlet valve 29 and the outlet valve 36, into the zero position a shown. Braking by the driver is now effective unthrottled at the wheel brakes 27 and 28.

Upon termination of a braking event, the second 2/2-way valve 18 is returned to its zero position a, because of the then resultant pressure difference between the brake line segment 14.1 and the master brake line 14 toward the master brake cylinder. The pressure fluid located in the wheel brakes 27 and 28 can therefore flow back to the master brake cylinder 12 and into the pressure fluid supply container 13 in an accelerated fashion through the second 2/2-way valve 18, bypassing the first 2/2-way valve 17. The switchover of the second 2/2-way valve 18 into its zero position a is also effective if the driver discontinues the braking event during anti-skid mode, or if the first 2/2-way valve 17 sticks in its switch position b because of some small malfunction. The second 2/2-way valve 18 also acts as a pressure limiting valve. In the case where pressure fluid is being pumped brought the pump 35 to the master brake cylinder 12, an undesirably high pressure in fact also acts upon the second 2/2-way valve 18, for instance if the flow path of the first 2/2-way valve 17 is stopped up, and switches the second 2/2-way valve 18 over into its zero position, via the control line 20. The pump pressure can now be reduced via the second 2/2-way valve 18.

Figure 2:
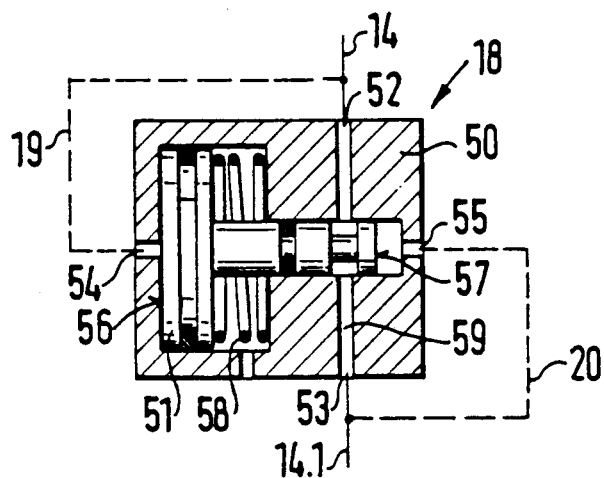
FIG. 2 shows a section through a multi-position valve used in the apparatus.

An exemplary embodiment of the second 2/2-way valve 18 is shown in FIG. 2. The 2/2-way- valve 18 has a housing 50, in which a stepped piston 51 is longitudinally guided. The housing 50 of the 2/2-way valve 18 has a connection 52 for the master brake line 14 coming from the master brake cylinder 12. A second connection 53 is provided for the segment 14.1 of the master brake line 14 leading to the wheel brakes 27 and 28. The housing also has a connection 54 for the control line 19 coming from the master brake line 14 and a connection 55 for the control line 20 that leads to the brake line segment 14.1. The operative pressure in the control line 19 is exerted on the larger end face 56 of the stepped piston 51, while the pressure in the control line 20 acts upon the smaller end face 57 of the stepped piston. A restoring spring 58 engaging the stepped piston 51 returns it to its zero position a shown, in which the flow path 59 through the 2/2-way valve 18 is open. The brake pressure operative in the master brake line 14 is capable of moving the stepped piston to the right into its switch position b, in which it interrupts the flow path 59 of the 2/2-way valve 18. Pump pressure that is increased compared with the brake pressure acts upon the smaller piston end face 57 via the control line 20 and is capable of moving the stepped piston 51, reinforced by the restoring spring 58, into its zero position a.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus (46) for avoiding locking of the wheels of a vehicle equipped with a brake system (10), having at least one single-circuit master brake cylinder (12) with a pressure fluid supply container (13), a first pressure control valve assembly (38) disposed in a brake line (14, 25) of a brake circuit I between the master brake cylinder (12) and a wheel brake (27), a pump (35) that pumps pressure fluid, drawn during an anti-skid operation, from a wheel brake (27, 28) back to the master brake cylinder (12) via said brake line (14), a second valve assembly (16) in said brake line (14) of said brake circuit (I), which brake line (14) connects the master brake cylinder (12) to the pump (35) and to said first pressure control valve assembly (38), wherein the pressure fluid drawn by the pump (35) from the wheel brake is fed through the line (14) between the first pressure control valve assembly (38) and the second valve assembly (16), and said second valve assembly (16) has a first 2/2-way valve (17) which has an unthrottled flow path in a spring-actuatable zero position (a) but has a throttled flow path in a switched position (b), when the anti-skid function becomes operative, the first 2/2-way valve (17) switches over into a switch position (b), and said second valve assembly (16) has a second 2/2-way valve (18) connected parallel with the first 2/2-way valve (17), in which said second 2/2-way valve (18) has an open flow path in a spring-actuatable zero position (a), while the pressure generated in the master brake cylinder (12) switches said 2/2-way valve (18) over into its switch position (b) that blocks the flow of fluid from the master cylinder.

2. An apparatus as defined by claim 1, in which the second 2/2-way valve (18) is switchable into its zero position (a) under the influence of the pressure generated by the pump (35).

3. An apparatus as defined by claim 2, in which the second 2/2-way valve (18) has a stepped piston (51), including a larger piston end face (56) which acts upon the pressure of the master brake cylinder (12), and a smaller piston end face (57) which acts upon the pressure of the pump (35).

4. An apparatus as defined by claim 1, in which said first and second 2/2-way valves (17, 18) of said second valve assembly (16) are combined into a structural unit (21).

* * * * *